June 24, 1930.   R. O. HENDRICKSON   1,766,124
AIR CLEANER FOR INTERNAL COMBUSTION ENGINES
Filed Sept. 18, 1929
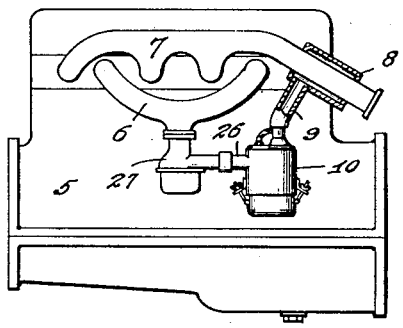
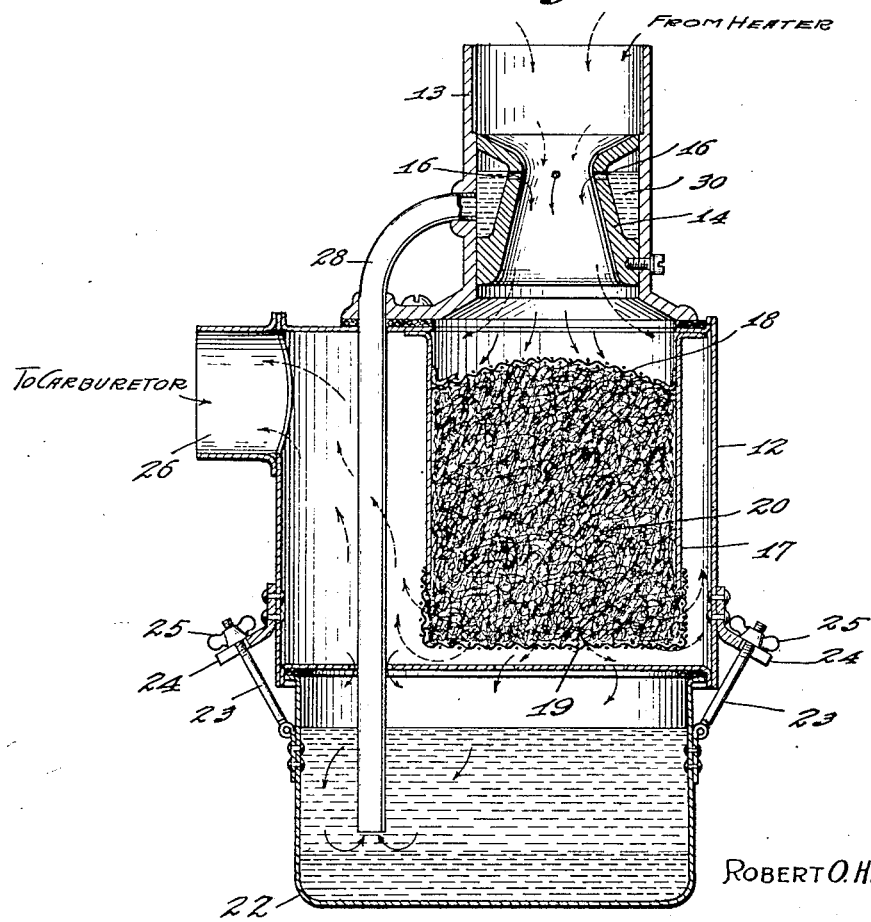
Inventor
ROBERT O. HENDRICKSON,
By James A. Walsh.
Attorney Patented June 24, 1930

1,766,124

UNITED STATES PATENT OFFICE

ROBERT O. HENDRICKSON, OF RACINE, WISCONSIN, ASSIGNOR TO J. I. CASE COMPANY, OF RACINE, WISCONSIN, A CORPORATION

AIR CLEANER FOR INTERNAL-COMBUSTION ENGINES

Application filed September 18, 1929. Serial No. 393,378.

The object of my invention is to provide a simple and highly efficient air cleaner for use in connection with internal combustion engines whereby the air will be effectively cleansed before entering the carburetor, and pass through the intake manifold into the engine free from foreign matter, for a purpose well known.

In the accompanying drawing, forming part hereof, Figure 1 is an elevation showing the application of my improvement to an engine manifold, and Fig. 2, a side elevation partly in section of my improved air cleaner.

In said drawing, the numeral 5 indicates the engine, 6 the intake manifold, and 7 the exhaust manifold, all of any desired construction and arrangement. About the exhaust manifold 7, I provide a heat retaining drum 8, which confines heated air passing through the conduit 9 connected to the air cleaner 10, substantially as indicated in Fig. 1.

The air cleaner comprises a body portion 12 preferably of cylindrical form having an inlet 13 connected to the conduit 9, which inlet communicates with a venturi tube 14, the latter having one or more inlets 16 in its wall as indicated. Beneath said tube is a filter comprising an imperforate body 17 having a screen 18 adjacent its upper end and provided with a similar reticulated bottom 19, said body between the upper and lower screens being supplied with a quantity of fibrous material 20 of any desired character. Beneath the body 12 I detachably connect an oil containing sump 22, which may be secured thereto in any appropriate manner, the means illustrated being swinging links 23 which engage keepers 24 and are secured thereto by nuts 25, so that by releasing the links the sump may be removed and cleansed and resupplied with oil. The body 12 is also supplied with an outlet 26 adapted to be connected to the carburetor 27 in a manner substantially as shown in Fig. 1. Connected to the inlet 13 is an oil pipe 28 which extends through the body 12 and downwardly into the sump 22 as shown.

In the operation of my improved air cleaner, it will be understood that the suction created by the engine draws heated air from the drum 8 down through the inlet 13 and through the venturi tube 14, and as it passes through the throat of the tube its velocity is accelerated in a well known manner. As such air passes immediately below the throat a vacuum is there created, which reduces the velocity of the air, so that when flowing into the filter 17 its force gradually becomes spent and by which action and gravity a portion of it gently impinges the oil in the sump, and is deflected to unite with that portion which escapes through the reticulated bottom of the filter, such air passing upwardly and through the outlet 26. During the operation described oil from the sump is constantly circulating up through pipe 28 into the reservoir 30 and thence through the inlet passage 16 due to the vacuum created by the reduction in velocity immediately below the throat of the venturi tube, passing into and through the fibrous material 20. As its precipitation is gradually slowed as indicated, grit, dust and foreign matter in the oil becomes freed from the fibrous material and constantly drips into the sump, thus obviating the necessity of removing the filter for cleansing, as such sediment and extraneous matter settles in the sump to be removed when necessary. In the manner described, it will be understood that the oil flowing into the sump circulates through the pipe and cleaner while the cleansed air passes upwardly into and through the outlet 26, and thence through the carburetor 27 and manifold 6 for the purpose stated.

I claim as my invention:

1. In an air cleaner, a body portion embodying an air discharging outlet, a sump detachably connected to the body, an inlet communicating with the body and adapted to be connected to air heating means, a venturi tube communicating with the inlet said tube having an oil receiving intake therein, a filter beneath said tube, and an oil circulating tube having its lower receiving end positioned in the sump and its upper end connected to the inlet for circulating oil from the sump into the venturi tube and downwardly through the filter and into said sump.

2. In an air cleaner, a body portion, an air receiving inlet communicating with the body and adapted to be connected to air heating means, a venturi tube in said inlet having an oil intake therein and through which tube air passes, a filter beneath the tube, a sump detachably connected to the body, a circulating tube having its lower end positioned in said sump and its upper end connected to said inlet to convey oil through said intake to commingle with the air passing through said venturi tube, and an air discharging outlet in the body adapted to communicate with a carburetor, whereby air and oil passing into the filter will be separated, the oil flowing into the sump to be reused and the air discharging through said outlet to be conveyed in purified condition to an engine.

3. In an air cleaner, a body portion, an inlet communicating with the body for withdrawing air into the cleaner, means in said inlet for accelerating the velocity of air passing therethrough and to then lessen the action of such air so that it will flow slowly in a downward direction, a filter through which the air passes, oil retaining means beneath the filter, and means positioned in the oil retainer and communicating with the inlet for circulating oil through the inlet commingled with the air passing therethrough whereby air will escape from the filter to be discharged from the cleaner and the oil separated therefrom and returned to the retainer.

4. In an air cleaner, a body portion, an inlet communicating with the body for withdrawing air into the cleaner, a venturi tube within the inlet having an oil intake therein and so exteriorly formed as to provide an oil reservoir between it and said inlet, a filter in the body portion, a sump beneath the filter, and a circulating tube having its lower end positioned in the sump and its upper end connected to said inlet for conveying oil through the inlet into said reservoir from which it is withdrawn through the intake in the venturi tube by the action of the air passing downwardly through the latter into said filter.

In testimony whereof I affix my signature.

ROBERT O. HENDRICKSON.